March 30, 1943.  C. J. SCRANTON  2,314,901
HARVESTER-THRESHER
Filed April 6, 1939

Inventor
C. J. Scranton
by
Attorney

Patented Mar. 30, 1943

2,314,901

UNITED STATES PATENT OFFICE 2,314,901

HARVESTER-THRESHER

Charles J. Scranton, La Porte, Ind., assignor to Allis-Chalmers Manufacturing Company, Milwaukee, Wis., a corporation of Delaware Application April 6, 1939, Serial No. 266,297

9 Claims. (Cl. 130—27)

This invention relates in general to improvements concerned with threshing grain and the like, and more particularly to threshing machines of the class wherein the harvesting mechanism is combined in a single apparatus with the threshing and separating mechanisms, machines of this type being generally known as harvester-threshers, combine harvesters or combines.

Up to a few years ago, commercial harvester-threshers have been relatively cumbersome and expensive machines, requiring a relatively large number of horses or a high powered tractor for propulsion or draft purposes, thus placing the machine out of the economic reach of the great mass of farmers whose limited acreage and means do not warrant the required investment in one of these large machines. Within the last few years, the attention of manufacturers of harvesting machinery and farmers generally has been drawn to the economic desirability of a harvester-thresher of such small weight, size, ready maneuverability about the ordinary small farm, and low cost, as to fairly permit ownership and use of such machines on the great number of farms of ordinary size throughout the country.

Through the present invention, I contemplate providing threshing apparatus of such design and construction as will permit the manufacture of a machine, particularly such as is of the harvester-thresher type, of high efficiency in the matter of clean grain recovery and at the same time of low cost, and hence permitting economical ownership and use of the machine by farmers operating farms of much smaller acreage than has been possible with combine harvesters heretofore commercially available.

Particularly desirable results in the matter of realization of advantages of the present invention are attained in a design of harvester-thresher apparatus wherein the harvesting, threshing and separating mechanisms are arranged in line with each other in the direction of travel of the machine, and wherein a simple form of separating mechanism including an elevated deflecting means, preferably associated with a beater fan, are provided at the forward end of the separator and suitably related to the threshing mechanism and auxiliary separating mechanism, such as a shaking rack, so that the greater portion of the separation and recovery of threshed grain or the like from the stalks is accomplished at a point relatively close to the threshing mechanism, thus permitting the required recovery of the threshed grain in a separator of a length considerably less than what has heretofore been considered proper commercial practice, and likewise permitting production of a machine of low weight and reduced cost and power requirements, and one which may be readily balanced about the axis of a single pair of supporting wheels. In a preferred embodiment of the invention, the threshing mechanism is effective to forcibly discharge therefrom the straw and threshed grain during the threshing operation, this material being forcibly discharged upwardly and rearwardly from the threshing mechanism against the elevated deflecting means which serves to deflect the heavier threshed grain particles downwardly onto the forward end of the separating rack, and a beater fan is operative to direct a blast of air forwardly against the straw mass beneath the deflector to thereby retard the rearward progress of the straw and loosen the same, and thus facilitate the downward passage therethrough of the threshed grain particles and their deposit on the forward end of the separating rack.

It is an object of the present invention to provide an improved design and construction of threshing apparatus, of particular utility in connection with machines of the harvester-thresher type, wherein novel auxiliary separating provisions are made for insuring that the greater portion of the separation and recovery of grain or seed from the stalks is accomplished at a point relatively near the threshing mechanism, and hence permitting efficient separation with a minimum length of path of the stalks through the separating mechanism, with consequent decrease in the weight and cost of the machine.

It is a further object of this invention to provide an improved apparatus of this general character embodying a rotating beating device, in association with an elevated deflector against which material is discharged rearwardly and upwardly by the threshing cylinder, the beating device contributing a counterblast of air on the material discharged from the threshing cylinder, which affords an effective winnowing or separating action on such material while the latter is suspended beneath the deflector and above the forward end of a mechanical separator.

These and other objects and advantages are attained by the present invention, various novel features of which are set forth in the accompanying description and drawing, disclosing an embodiment of features of the invention, and are more particularly defined in the appended claims.

Figure 1:
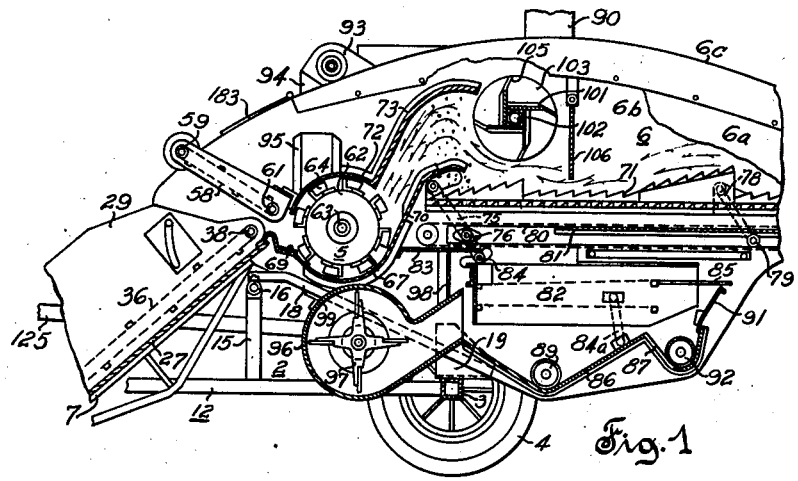
Fig. 1 is a view in elevation, with parts in longitudinal section, from the grainward side, of a harvester-thresher embodying features of the present invention.
Figure 2:
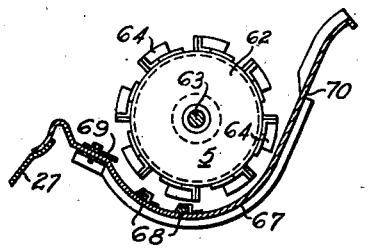
Fig. 2 is a radial section through the threshing cylinder and concave.

In the embodiment of the invention disclosed in the drawing, a supporting frame 2 includes or is supported on an axle 3, the latter being of square tubular cross-section, supported on a pair of traction wheels 4 journaled in bearings at the ends of the axle.

The separating mechanism, and the threshing mechanism, including a threshing cylinder 5, are mounted with a housing 6, to the forward end of which a header platform 7 is pivoted for adjustment in a vertical plane to position a harvesting sickle, mounted at the forward end of the header platform, in desired position of adjustment relative to the ground.

The supporting frame 2 includes a draft portion 12 extending forwardly for attachment to the drawbar of a tractor, and upright bars 15 carried by the draft portion 12. A horizontal crossbar 16 is carried by the upper ends of the uprights 15 and serves to support the forward ends of rearwardly and downwardly extending bars 18, the latter having supporting feet or plates 19 secured to the rear end thereof, these feet being in position to be secured to and carried by the axle 3. The frame structure may be mounted on the axle by suitably securing the rear ends of the bars 12 and the supporting feet 19 to axle 3, preferably by bolted connections which, while serving to securely mount the frame structure on the axle, still permit ready assembling and disassembling, as for convenience in storing and shipping. And with the frame structure disposed wholly forward of the axle, a minimum length of the frame is attained.

The header platform 7 consists essentially of a bottom plate 27 supported on a suitable bracing frame, with side walls 28 and 29 on the grainward and stubbleward sides, respectively, projecting at right angles from and preferably integral with the bottom plate, the header platform being adjustable up and down through the pivotal connection of the rear portion of the side walls 28, 29 with the forwardly projecting portion of the side walls of the housing 6.

A main conveying draper 36 is mounted on a lower or guide roller rotatably mounted in the forward portion of the side walls of the header platform, and an upper or driving roller 38 mounted on a shaft rotatable in bearings carried by the forward portion of the side walls of the housing 6 and having its axis coincident with the pivotal axis about which the header platform is adjusted toward and from the ground.

The conveying draper 36 is of substantially the same width as the threshing cylinder 5, and the cutting sickle may be of the same width as the draper and the threshing cylinder; and with this relation of these parts, which are in line with each other in the direction of travel of the machine, the swath of grain cut by the sickle is carried by the reel, rearwardly onto the forward portion of the main draper 36, across substantially the full width thereof, and the grain is carried upwardly by the draper, with the grain heads first, toward the threshing cylinder, the cut grain being thus fed to the cylinder across substantially the full width thereof.

The housing 6 for the threshing and separating mechanisms is assembled as a unitary housing from two spaced side wall plates 6a, 6b and a roof plate 6c, the latter preferably being slightly rounded and provided with curved depending flanges, the side walls being secured to the roof plate to form the housing by connecting the depending flanges of the roof plate to the upper edges of the side plates, by riveting, welding or the like, as indicated at 56. The side walls may be of relatively thin plate material, and their relatively rigid supporting relation with respect to the roof and the internal elements of the threshing and separating mechanism, referred to hereinafter, may be augmented by means of spacing and bracing plates or rods, certain of which are secured, preferably by welding, to portions of the opposed side walls and the adjacent depending flanges of the roof plate, where these plates are joined together; and other spacing and bracing elements are disposed between and similarly connected to the side walls at the lower portion thereof at positions where they do not interfere with the operating mechanisms within the housing.

An upper conveying draper 58 is disposed within the forward portions of the side walls of the housing 6 and located above the rear end of the main draper 36. The upper or driving roller 59 of the upper draper is mounted on a shaft journaled in bearings carried by the side walls 6a, 6b of the housing, or an extension therefrom; and the lower or guide roller 61 of this draper is mounted on a shaft journaled in the side walls 6a, 6b, this guide roller 61 being positioned to the rear of the upper roller 38 of the main draper. The arrangement of the draper 58 is such that the lower course of this draper moves rearwardly, in a downwardly inclined direction, and serves to press the material on the rear end of the main draper and to forcibly carry such material downwardly from the rear edge of the main draper and to the under side of the rotating threshing cylinder 5.

The threshing cylinder 5 is in the form of an open drum comprising spaced circular plates 62 mounted on a shaft 63, these circular plates having peripheral flanges on which circumferentially spaced longitudinally extending beater or threshing bars 64 are mounted, these bars being preferably slightly inclined from a direction parallel to the axis of the cylinder shaft. The cylinder shaft 63 is rotatably supported in bearings secured in position in the opposed side walls of the housing 6, preferably by mounting the bearings in plates covering apertures in the side walls of sufficient size to permit insertion of the threshing cylinder into position through such an aperture. The bearings are preferably adjustable in their supports, so as to permit adjustment of the axis of the threshing cylinder upwardly in a direction slightly inclined from the vertical. The stubbleward side of the cylinder shaft is provided with a driving pulley which serves to supply power to the shaft.

A stationary threshing element or concave is provided at the lower side of the cylinder, this concave being preferably in the form of an imperforate plate 67 slightly spaced from and following the general curvature of the lower portion of the path of the cylinder threshing bars, this concave plate being attached, preferably by flanges integral with the plate, to the side walls of the housing 6. The upper face of the concave plate 67 is provided with longitudinally extending stationary threshing bars 68, preferably a plurality thereof, arranged substantially parallel to the axis of the cylinder. The forward edge of the concave plate and the rear edge of the bottom plate 27 of the header platform are in overlapping relation at a point adjacent the upper roller 38 of the main feed draper 36, preferably with a suitable form of choke or ledger plate overlapping the forward edge of the concave plate and adjustable toward and from the path of the cylinder, as indicated at 69.

The rear part of the substantially circular body portion of the concave extends upwardly, preferably following a tangent, to a point slightly above the cylinder shaft; and this rear portion of the concave has an upwardly rising extension 70 therefrom, the lower portion of such extension substantially following the tangent, and the upper portion thereof curving rearwardly to a slight extent to a point above and preferably just beyond the forward edge of an oscillating shaking rack 71, with the extreme upper end of the extension preferably turned slightly downward. Upwardly extending spaced rake-like spring fingers, of the hereinabove described general shape of the upper rear portion of the extension of the concave, may be substituted for such concave plate extension.

Each of the threshing bars 64 is preferably in the form of an angle bar of metal having one flange secured to the peripheral flanges of the plates 62 and having a flange at its forward or leading edge provided with a yielding resilient facing of rubber or the like. The stationary threshing bars may be of a form similar to that described in connection with the cylinder threshing bars; but they are preferably in the form of bars of yieldingly resilient material, such as rubber of considerable stiffness, but of a yielding character at their forward faces, and fixedly secured to the upper face of the concave plate. The forward edge of each concave bar is preferably slightly inclined rearwardly for advantages during the threshing operation. The rubber or like resiliently yielding leading faces of the cylinder bars and concave bars have the effect, in the operation of the machine, of considerably reducing the breakage of grain kernels.

The upper side of the threshing cylinder is enclosed by a housing plate 72 extending between the side walls of the housing 6 and preferably secured thereto by integral flanges at the side edges of such plate. This plate 72 follows the curvature of, and is slightly spaced from, the path of the rotating cylinder bars. The forward edge of the plate 72 terminates in the rear of and adjacent the rear end of the upper feeding draper 58; and this housing plate 72 extends rearwardly to a point substantially beyond the axis of the cylinder. This housing plate 72 has a rearward extension 73, the forward portion of this extension rising upwardly and rearwardly at an angle of approximately forty-five to sixty degrees to the horizontal, and extending substantially parallel to the rear tangent portion of the concave plate 67; and the rear portion of this extension 73 curves upwardly and easily toward the roof of the housing, with the rear edge portion of the extension preferably inclined slightly downward from the horizontal.

The separating rack 71 may be of a heretofore known shaking type, but of shorter length than has heretofore been considered of suitable commercial efficiency, and it is mounted in the housing 6 in the rear of the threshing cylinder; and the rack is of a width only slightly less than the distance between the upper portions of the side walls 6a, 6b of the housing. Since the rack 71 extends forwardly to a point beneath the rear end of the concave extension, this insures that all of the straw and grain passed beyond the housing will eventually drop onto the rack and be subjected to the separating action of the latter.

The rack 71 is suspended from the upper ends of rocker arms or links secured on transverse shafts pivotally mounted in bearings in the side walls of the housing 6, rocker arms 75 at the forward end of the rack being mounted on a transverse shaft 76 and rocker arms or links 78 near the rear end of the rack being secured on a transverse shaft 79. The rocker arms or links are preferably mounted on the outer sides of the housing side walls and have an extension at their upper ends projecting through elongated slots in the side walls, the rack being suspended on such extensions.

Grain dropping through the rack 71 falls through a conventional form of traveling grain drag 80. The upper course of the grain drag moves forwardly and the lower course rearwardly, a plate 81 being disposed beneath the rear portion of the upper course of the grain drag, so that grain dropping through this portion of the drag is carried to the forward edge of the plate 81, whence it drops through the lower course of the drag, to the forward portion of the upper sieve of a cleaning shoe 82, which usually comprises a plurality of superposed screens or sieves. Grain falling through the forward portion of the rack falls through both courses of the drag 80, a part falling on a transverse partition wall 83 from which it is drawn rearwardly by the drag to a point where it drops on the forward end of the upper screen of the cleaning shoe; and another portion of the grain drops through both courses of the drag directly onto the upper sieve.

The desired vibratory motion is imparted to the cleaning shoe by suspending the forward portion of the same on a transverse shaft 84 carried by the lower extensions of the rocker arms 75, the upper portions of which suspend the forward portion of the rack 71, and suspending the rear portion of the cleaning shoe on a pair of links 84a pivoted to the side walls of the housing.

The upper sieve of the cleaning shoe is provided with a tailings rake 85 or apertured plate to permit unthreshed heads to fall therethrough, while at the same time carrying pieces of straw, which have passed onto the sieve, from the rear end of the rake, this straw dropping or being blown to the ground by the cleaning air.

The side walls 6a, 6b are closed beneath the cleaning screen, and likewise braced at this point, by adjoining trough-shaped plates 86, 87 each preferably having flanges at its side edges through which these plates are secured to the side walls. The trough plate 86 lies beneath the body portion of the cleaning shoe, in position to receive all grain dropping through the cleaning sieves and convey the grain by gravity to a transverse screw conveyer 89 which conveys the grain, along the trough and through a suitable connection to an elevating conveyor 90 which is provided with a suitable chute discharging the grain to a grain bin suitably mounted on the machine, or as may be desired, to discharge chutes positioned over a bagging platform which may be substituted for the grain bin.

The trough plate 87 lies beneath the tailings rake 85 in position to receive material passing through the rake and material passing over the rear edge of the lower screens of the cleaning shoe. The rear side of the trough 87 is preferably provided with a detachable extension wall 91 extending upwardly and rearwardly toward the discharge end of the tailings rake 85 and in position to insure that the trough 87 receives all unthreshed grain and grain heads which pass through the tailings rake. A transverse conveyer 92 is disposed at the bottom of the trough 87 and conveys the tailings along this trough and through a tubular extension, communicating with the stubbleward side of the trough, to an elevating conveyer 93, this elevator having a discharge communicating with a chute or conveyer 94 which conveys the tailings to a suitably positioned discharge device 95 extending between the side walls 6a, 6b, for feeding the tailings to the threshing cylinder through the upper forward portion of the upper enclosing wall 72 of the cylinder chamber, for a second threshing operation on such tailings. A forward extension from the upper plate 72, opposite the tailings discharge 95, prevents the tailings from being thrown forward over the upper side of the auxiliary draper 58.

The housing 96 of the fan 97, for supplying cleaning air to the cleaning shoe 82, is mounted on the frame 2, or it may be mounted on, or form a part of, the housing 6; and the housing 96 constitutes a substantial closure for the forward end of the space within which the cleaning shoe is located. The discharge end of the housing 96 of the centrifugal fan 97, projects rearwardly through an aperture in a plate or frame 98 which serves as a bracing plate between the lower portion of the side walls, and likewise may complete the front closure of the space within the side walls wherein the cleaning shoe is located. The fan housing 96 may be attached in position wholly through attachment to the side walls 6a, 6b of the main housing, or to transverse plates or braces attached thereto; or, preferably, the fan housing may be readily attached in and detached from position with respect to the main housing, after the latter is mounted in position on the frame, a bracket 99 attached to the fan housing being used to detachably mount the fan housing on the rearwardly extending bars 18 of the supporting frame 2. The shaft of the fan 97 may be mounted, while the latter is in place within its housing, in bearings detachably suspended from the rearwardly extending bars 18.

The lower edge of the part of the side walls 6a, 6b, overlying the inclined portion of the rearwardly extending bars 18 of the supporting frame, are preferably provided with stiffening flanges adapted to be detachably secured to the supporting bars 18 and feet 19 to secure the housing 6 on the frame.

The center of gravity of the body comprising the housing 6 and parts carried thereby is in the rear of the axle 3, but the support and attachment of the housing to the frame structure, particularly through the horizontal bar 16 of the frame structure, causes a definite portion of the weight of the housing to be transmitted through the frame forwardly of the axle, and the result is that the housing and frame, when thus assembled, have their combined weight substantially balanced about the axle, preferably with a slight excess of weight at the forward side of the axle to insure that the forward end of the draft beam 12 may rest lightly on the ground and may be easily lifted from the ground for attachment to the draw bar of a tractor.

In the normal operation of the machine, the grain, severed by the harvester sickle, is carried rearwardly onto the main feed draper 36 which conveys a steady thin stream of cut grain, with the grain heads foremost, to and across the full width of the threshing cylinder. And the threshed grain and stalks are threshed and discharged from the threshing cylinder in a thin and substantially even stream toward the separating mechanism for action by the latter, this material being discharged from the threshing mechanism, rearwardly and upwardly thereof, with considerable force, by reason of the fan action of the cylinder threshing bars moving at relatively high speed within the imperforate concave. The material thus discharged from and rearwardly and upwardly beyond the threshing mechanism, particularly the relatively heavy threshed grain particles, impinge with considerable force against the upper rearward extension of the wall 73 and are deflected downwardly thereby and through the forward end of the separating rack. There is but little straw lying on this forward end portion of the rack, due to the tendency of the relatively lighter straw to be deflected or guided rearwardly, more than downwardly, by the upper deflecting portion of the wall 73, thus permitting more ready recovery of the deflected threshed grain particles through the foremost portion of the rack.

I have discovered that the separating action on the grain and straw discharged from the threshing cylinder may be further increased, beyond what had heretofore been recognized as commercially practicable, at a point relatively close to the threshing cylinder or adjacent the forward end of a separating rack, through the use of an auxiliary separating beater arranged in a particular association with the separating rack, the deflector plate 73 and the threshing cylinder. And the highly increased degree of separation through such facilities, as described hereinafter, are such that the relatively great length of separating rack heretofore deemed necessary to produce the required commercial efficiency of separation in a combine harvester may be very greatly reduced, and hence the weight and cost of the harvester may be accordingly decreased.

In accomplishing the desired results in the apparatus illustrated, I make use of a rotary beater, capable of exerting a fan action, in the separator housing over the forward portion of the separating rack, and in a position substantially to the rear of and above the threshing cylinder. While rotary beaters have heretofore been used in the separating chamber of a threshing apparatus, the function of such beaters has been primarily that of merely assisting in a mechanical way in moving the straw rearwardly along the separating rack. However, as indicated in the drawing, I utilize a rotary beater in the separating chamber in such relation to the separating rack and threshing mechanism as to insure a further very desirable action of fanning or winnowing the straw while in suspension over the forward portion of the separating rack, this resulting in relatively free falling of the heavier particles, i. e., threshed grain or seed, deflected downwardly from the upper rearward portion of the deflecting wall 73, through the forward end of the separating rack where it is relatively free of the usual thick mat of straw which would impede the falling of grain through the rack.

Figure 3:
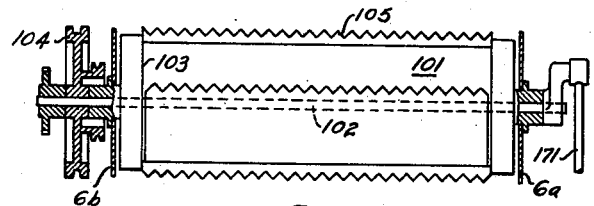
Fig. 3 is a plan view of a detail, with parts in section.
Figure 5:
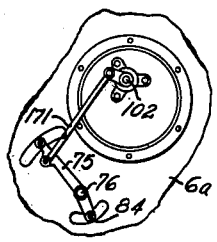
Fig. 5 is a view in elevation, from the grainward side, of a detail.
Figure 4:
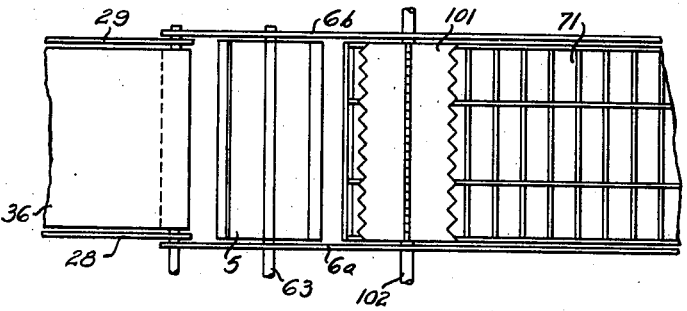
Fig. 4 is a longitudinal diagrammatic plan view, with parts omitted, of portions of the harvester-thresher.

In accordance with the disclosure herein, a rotary beater 101, having a plurality of substantially imperforate vanes, is mounted on a transverse shaft 102 in the upper part of the separating chamber near the forward end thereof, the beater shaft being mounted in bearings on the side walls 6a, 6b, or preferably, the bearings at one or both sides, instead of being mounted in the side wall itself, are mounted in a plate removably attached to the side wall of the housing about an opening of sufficient size to permit bodily removal and insertion of the beater into operative position. As indicated, the beater includes four substantially imperforate vanes set at right angles to one another and held between annular side plates 103 and attached to hub structures mounted on the beater shaft adjacent the inner surface of the side walls of the housing; and the beater shaft 102 is provided with a driving pulley 104 outside of the stubbleward side of the housing 6. The vanes preferably have their radially outer ends inclined rearwardly, as indicated at 105, and these outer ends are preferably formed as teeth, as indicated in Fig. 3, which are capable of exerting a combing action on the straw which loosens grain particles therefrom. and likewise separates matted portions of the straw.

As indicated in the drawing, the beater is located above the threshing cylinder, and is of slightly less diameter than the threshing cylinder. The upper portion of the path of the beater is preferably slightly above the rear end of the deflecting roof or plate 73; and the rear edge of the guiding or deflecting plate 73 projects into close proximity to the path of the vanes of the beater, thus preventing the passage of straw to the upper side of the beater.

The desirable speed of the threshing cylinder is determined by the character of the crop being threshed, and in a commercial machine of the character illustrated, may vary generally from approximately 425 R. P. M., for heavier seed crops, such as certain varieties of beans, to approximately 1600 R. P. M., for the lighter grains and grasses, the desirable speed generally varying inversely as the weight of the grain or seed being recovered. As heretofore deescribed, the discharge passage for straw and grain leaving the threshing cylinder under the influence of centrifugal force and the fan action of the beater bars of the cylinder, is defined by the transverse guiding wall 73 and the tangential rear portion of the concave wall plate 67 and its extension 70. This tangential rear portion of the concave wall guides the material discharged from the threshing cylinder, in a thin stream of a width substantially equal to that of the cylinder, in a path which causes the material to be projected toward the curved upper portion of the wall 73, and the material is deflected therefrom downwardly toward the path of the beater 101 and the rack 71. However, due to the very considerable fan action of the rotating beater, a counterblast of air from the beater acts on the straw as it reaches or approaches the curved roof portion of the wall 73, this counterblast opposing the movement imparted to the straw through its discharge from the threshing cylinder; and the general effect of the counter air blast from the beater, in addition to slowing up the movement of the straw, is to fluff and spread out the straw, in mid-air, in the relatively large space between the curved roof portion of the plate 73 and the forward portion of the rack, permitting the relatively heavier particles of threshed grain or seed to more readily drop or be projected, after impinging on the curved roof portion of the wall 73, through the loosened straw mass, and onto and through the adjacent portion of the rack.

The terminal teeth of the beater vanes comb any portions of the straw coming in contact therewith; and the effect of the beater, in addition to producing a winnowing effect, incident to the counter air blast, is to draw any straw with which it comes in contact, onto the rack, and thereafter to supplement the vibratory motion of the rack in moving the straw along the rack to a position rearwardly of the beater.

A swinging baffle 106 is pivoted at its upper end on projections from the side walls or the roof of the housing 6, in the rear of the beater 101, and receives the impact of any straw thrown forcibly by the beater toward the rear of the rack, and insures that the straw passes steadily along the rack and is subjected to the vibratory action thereof throughout the remainder of its length.

The separating action may be generally described as one wherein the shelled or threshed grain and the straw, propelled from the cylinder chamber by centrifugal action and cylinder blast, are subjected, while suspended in mid-air, to a counterblast of air from the beater, located above and to the rear of the cylinder just over the front portion of the straw rack. The winnowing action of this counter or conflicting air blast on the grain and straw, in suspension, and the impingement of threshed grain particles on the upper roof portion of the wall 73 and their rebound therefrom toward the rack, supplemented by the combing and forcing action of the beater on the straw, effectively accomplishes by far the major part of the full separating action at this point, before the straw starts back along the remainder of the straw rack.

Power is supplied to the various operating mechanisms of the apparatus, such as the harvesting mechanism, main and auxiliary feed drapers, threshing cylinder, beater fan, separating rack, and air fan and cleaner, and grain and tailings conveyors, through suitable driving connections from a drive shaft 125, the latter being suitably mounted for rotation in supporting bearings carried by the supporting frame 2; and the forward end of the drive shaft having a suitable flexible power connection for attachment to a power takeoff shaft on a tractor whose drawbar is flexibly coupled to the front end of the draft frame 12.

The beater shaft, through an eccentric and pitman connection 171, on the grainward side of the housing 6, to the corresponding rocker arm 75 on the shaft 76, serves to impart the desired oscillatory movement to the shaking rack 71 and the cleaning shoe 82.

The roof plate 6c of the housing 6, instead of extending as a single piece to its forward edge, preferably terminates at a point above the threshing cylinder, and a roof extension 183 is hinged to the forward edge of the body portion of the roof and extends forwardly to a point just in the rear of the auxiliary feed draper 58, so that, on lifting the hinged cover plate 183, access may be had to the space underneath.

It should be understood that my invention disclosed is not limited to the specific details and features of construction and operation shown and described herein, and that it embraces all embodiments of the invention defined by the annexed claims.

It is claimed and desired to secure by Letters Patent:

1. In a harvester-thresher, threshing mechanism, said threshing mechanism comprising a rotatable cylinder and a cooperative substantially imperforate concave beneath said cylinder and extending rearwardly and upwardly to a point above the axis of said cylinder, said threshing mechanism being operative under normal operating conditions to forcibly discharge therefrom in a rearwardly and upwardly directed stream substantially all of the material passed through said threshing mechanism, a deflecting plate disposed above and to the rear of said threshing mechanism in a position to be impinged upon by threshed grain particles of the material forcibly discharged along with straw from the threshing mechanism and to deflect said threshed grain downwardly, and separating mechanism disposed rearwardly of said threshing mechanism and including a rotary fan disposed above the axis of said threshing mechanism and operable to direct a blast of air against said discharged material beneath said deflecting plate to substantially impede the rearward progress thereof and which loosens said straw and facilitates the dropping of threshed grain through the straw while the latter is suspended in air in advance of said fan.

2. In a harvester-thresher, threshing mechanism, said threshing mechanism comprising a rotatable cylinder and a cooperative substantially imperforate concave beneath said cylinder and extending rearwardly and upwardly to a point above the axis of said cylinder, said threshing mechanism being operative under normal operating conditions to forcibly discharge therefrom in a rearwardly and upwardly directed stream substantially all of the material passed through said threshing mechanism, a deflecting element disposed above and to the rear of said threshing mechanism in a position to be impinged upon by threshed grain particles of the material forcibly discharged along with straw from the threshing mechanism and to deflect said material downwardly, and separating mechanism disposed beyond said threshing mechanism and including a shaking rack, and a rotary fan disposed above and to the rear of the forward edge of said rack and above the axis of said threshing mechanism and operable to direct a blast of air against the material discharged from said threshing mechanism and substantially impede the rearward progress of the straw beneath said deflecting element and facilitate the dropping of threshed grain particles through the straw and onto the forward portion of said rack while the straw is suspended in air in advance of the fan.

3. In a harvester-thresher, threshing mechanism, means for conveying harvested material to said threshing mechanism in a stream across the full width of the latter, said threshing mechanism comprising a concave and a horizontal threshing cylinder above and in operative relation to said concave, said concave having an extension projecting upwardly and rearwardly to a point above the axis of said cylinder and being substantially imperforate up to said point, an upwardly and rearwardly extending wall having its forward edge in proximity to the upper part of the path of said cylinder and having its rear portion constituting a deflecting element disposed across the discharge path formed between the extension of said concave and the lower portion of said upper wall, and a separating rack disposed to the rear of said threshing mechanism with its forward portion beneath said deflecting element and operative to advance material on the rack in a direction rearwardly with respect to the direction of travel of the harvester-thresher, said threshing cylinder in normal operation being effective to forcibly discharge threshed grain and straw through said passage and against said deflecting element, said deflecting element being effective to deflect threshed grain impinging thereagainst downwardly onto the forward portion of said rack while affording less deflecting action upon and impedance to rearward movement of the lighter straw particles.

4. In a harvester-thresher, threshing mechanism, said threshing mechanism comprising a substantially imperforate concave and a horizontal threshing cylinder above and in operative relation to said concave, said imperforate concave extending upwardly and rearwardly to a point above the axis of said cylinder, a rearwardly extending deflecting wall above and to the rear of said cylinder, said threshing cylinder in normal operation being operative to forcibly discharge in an upward and rearwardly directed path against said deflecting wall all of the material fed to said threshing mechanism, and separating mechanism to the rear of said threshing mechanism and comprising a rotary fan having its axis parallel to that of the cylinder and operable to produce a blast of air on the straw and threshed grain discharged from said cylinder at a point in advance of said fan and beneath said deflecting wall to thereby impede the rearward progress of and loosen said straw particles and facilitate the dropping of threshed grain particles deflected from said deflecting wall through the straw in advance of said fan and rearwardly of the extension of said concave.

5. In a harvester-thresher, threshing mechanism, means for conveying harvested material to said threshing mechanism in a stream across the full width of the latter, said threshing mechanism comprising a substantially imperforate concave and a threshing cylinder above and in operative relation to said concave, said concave projecting upwardly and rearwardly to a point above the axis of said cylinder, a rearwardly extending wall above and to the rear of said cylinder and in the path of straw and threshed grain forcibly discharged from said cylinder, and separating mechanism to the rear of said threshing mechanism comprising a separating rack having its forward portion beneath said deflecting wall, and its forward edge below the rear edge of the extension of said concave, and a rotary fan disposed above the axis of said threshing cylinder and having its axis parallel to that of the cylinder and provided with vanes having combing projections at their radially outer ends and operable to produce a blast of air on the material discharged from said cylinder at a point in advance of said fan and beneath said deflecting element to impede the rearward progress of said material and loosen said straw to facilitate the dropping of threshed grain particles through the straw in advance of said fan, said fan being also operable to comb portions of straw coming into contact with said fan and assist said rack in moving straw along said rack.

6. In a harvester-thresher, threshing mechanism, conveying mechanism operative to convey material rearwardly to said threshing mechanism, said threshing mechanism comprising a substantially imperforate concave and a threshing cylinder above and in operative relation to said concave, said threshing cylinder including a plurality of circumferentially spaced threshing bars at the periphery of said cylinder and of extended length in the general direction of the axis of said cylinder, said concave projecting upwardly and rearwardly to a point above the axis of said cylinder, an upwardly and rearwardly extending wall having its forward edge in proximity to the upper part of the path of said cylinder and having an upper extension constituting a deflecting element disposed across the path formed between the extension of said concave and the lower portion of said upper wall, said threshing cylinder in normal operation being effective to forcibly discharge substantially all of the threshed grain and straw through said passage and against said deflecting element, and separating mechanism to the rear of said threshing mechanism and comprising a separating rack with its forward portion beneath said deflecting element, and a rotary beater fan having its axis parallel to that of said cylinder and disposed to the rear of said deflecting element and operable to produce a blast of air on the material discharged from said cylinder at a point beneath said deflecting element to loosen straw discharged from said cylinder and facilitate the dropping of threshed grain particles through such straw in advance of said fan, said beater fan being also operable to contact at its lower portion a mass of straw on said rack and assist in advancing said straw along said rack.

7. In a harvester-thresher, threshing mechanism comprising a substantially imperforate concave, and a rotatable threshing cylinder having peripheral threshing projections in operative relation at its underneath side with said concave, said concave including a portion extending rearwardly and upwardly to a point above the axis of said cylinder, separating mechanism including a separating rack disposed to the rear of said threshing mechanism and operative to convey threshed straw rearwardly with respect to the direction of travel of the harvester-thresher, and a stationary deflecting element disposed at a point rearwardly and upwardly of said cylinder and over the forward portion of the rack and in the path of material discharged from said threshing mechanism along said extension of said concave during normal operation of said threshing mechanism, and said threshing mechanism being operative when driven at normal operating speed to forcibly discharge against said deflecting element substantially all of the material passing into said threshing mechanism and said deflecting element being operative to deflect the threshed grain particles downwardly onto the forward end portion of said rack.

8. In a harvester-thresher, threshing mechanism comprising a substantially imperforate concave, and a rotatable threshing cylinder having peripheral threshing projections in operative relation at its underneath side with said concave, said concave including a rearwardly and upwardly projecting guiding portion at the rear side of said cylinder, separating mechanism disposed rearwardly beyond said threshing mechanism and operative to convey threshed straw rearwardly with respect to the direction of travel of the harvester-thresher, said separating mechanism including a stationary deflecting element disposed at a point rearwardly and upwardly of said cylinder in the path of material discharged from said threshing mechanism, and a rotary fan having its axis parallel to and disposed above the axis of said cylinder and operative to force a blast of air forwardly upon said discharged material adjacent said deflecting element to thereby impede the rearward progress of said straw and effecting a winnowing separation of the deflected particles of threshed grain from the straw while the latter is suspended in air, said threshing mechanism being operative when driven at normal operating speed to forcibly discharge against said deflecting element substantially all of the material fed to said threshing mechanism.

9. In a harvester-thresher of the type comprising threshing and separating mechanisms and wherein during normal operation of the machine substantially all of the threshed grain is discharged from the threshing mechanism into the separating mechanism for recovery therein from the straw, threshing mechanism comprising a horizontal threshing cylinder and a threshing concave beneath and in cooperative relation to said cylinder and substantially impervious to passage of threshed grain therethrough during normal operation of said threshing mechanism, said concave including a portion extending rearwardly and upwardly to a point above the axis of said cylinder, a stationary guiding and deflecting element above and spaced from said extension of said concave having an upwardly extending lower portion rising from a point adjacent the periphery of said cylinder and a rearwardly extending upper portion constituting a deflecting element disposed across the path formed between the forward and upwardly rising portion of said guiding and deflecting element and said extension on said concave, a separating rack disposed to the rear of said threshing mechanism with its forward portion beneath said deflecting element and being operative to advance straw thereon in a direction rearwardly with respect to the direction of travel of the harvester-thresher, said threshing mechanism duing operation at normal operating speed being effective to forcibly discharge substantially all of the threshed grain and straw through said passage and to cause said threshed grain to forcibly impinge on said deflecting element, and said deflecting element being effective to deflect the threshed grain impinging thereagainst downwardly onto the forward portion of said rack while affording less impedance to rearward movement of the straw.

CHARLES J. SCRANTON.